May 31, 1966  L. C. PARKER  3,253,773
REFRIGERATING APPARATUS
Filed Dec. 28, 1964
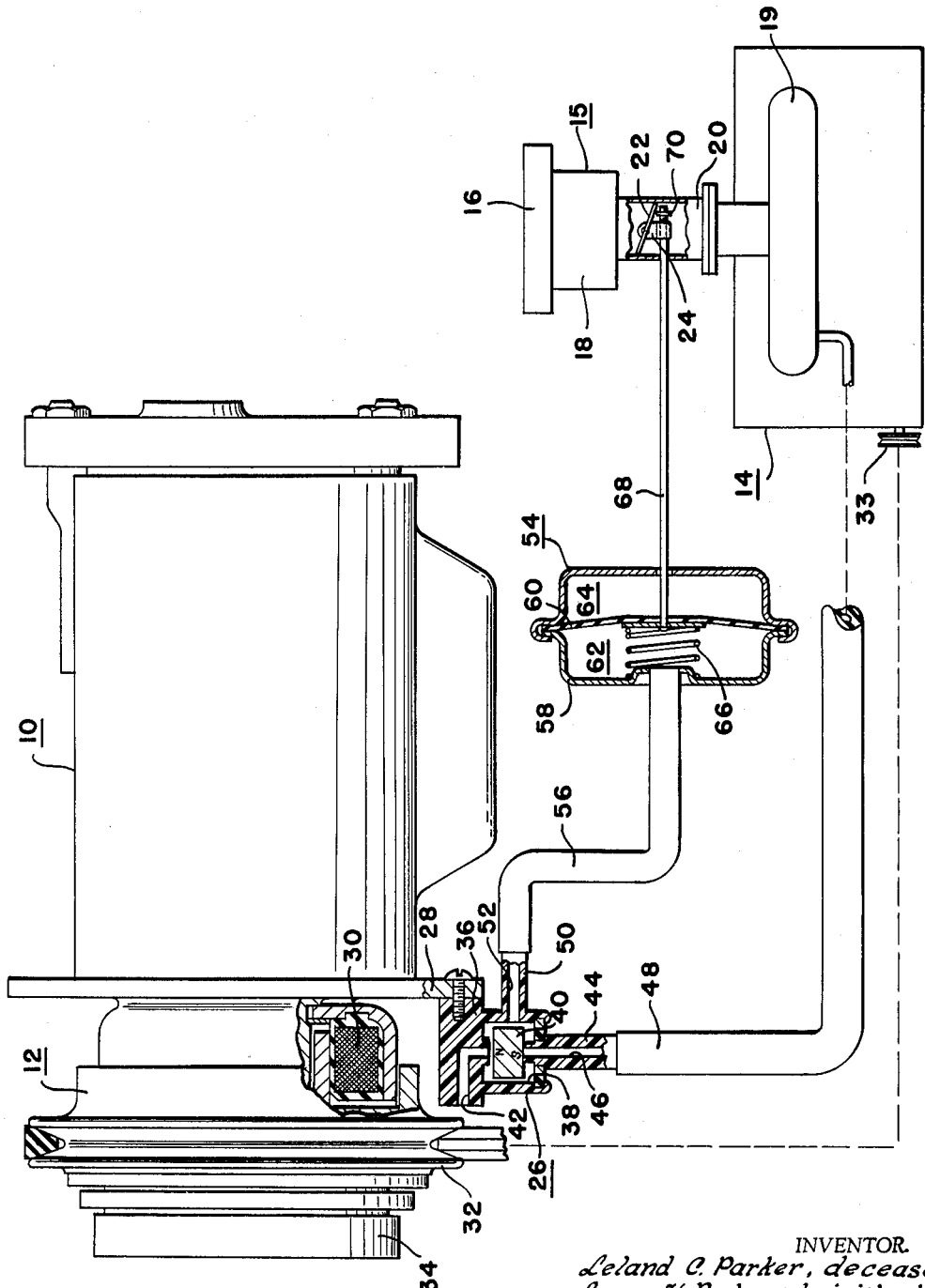
INVENTOR.
*Leland C. Parker, deceased*
*Laura H. Parker, administratrix*
*J.C. Evans*
Attorney { # United States Patent Office 3,253,773
Patented May 31, 1966

3,253,773
REFRIGERATING APPARATUS
Leland C. Parker, deceased, late of Rochester, N.Y., by Laura H. Parker, administratrix, Rochester, N.Y., assignor to General Motors Corporation, Detroit, Mich., a corporation of Delaware
Filed Dec. 28, 1964, Ser. No. 422,079
3 Claims. (Cl. 230—9)

This invention relates to automobile air conditioning systems and more particularly to a speed control assembly for regulating the idle speed of an engine in response to refrigerant compressor operation.

One problem in many automotive air conditioning systems arises during operation thereof when the engine of the automobile is operating at normal idle settings. In such a case, the power takeoff from the engine is reduced to a point where the compressor speed is insufficient for producing a desired refrigerant output for adequate space cooling within the passenger compartment of the vehicle.

Accordingly, an object of the present invention is to increase the speed of an engine at idle for driving the compressor of an automotive air conditioning system to maintain a desired space cooling capacity when the automobile is stopped.

A further object of the present invention is to improve the operation of automobile air conditioning systems having an engine driven compressor with a magnetic clutch component by the provision of air fuel supply means responsive to the flux field generated by the magnetic clutch for regulating the fuel air supply to the engine.

Still another object of the present invention is to improve the operation of automotive air conditioning systems having an engine driven compressor with a magnetic clutch component by the provision of a fluid system including a fluid actuated servomotor and a magnetic valve assembly responsive to the flux field generated by the magnetic pulley to control the servomotor for regulating the air-fuel ratio to the engine.

Further objects and advantages of the present invention will be apparent from the following description, reference being had to the accompanying drawing wherein a preferred embodiment of the present invention is clearly shown.

In the drawing:

The figure is a schematic view of an automobile air conditioning subassembly including the idle adjust system of the present invention.

In the drawings a subassembly in an air conditioning unit of the type shown in United States Patent No. 2,892,319, issued June 30, 1959, is illustrated including a compressor 10 and a magnetic clutch assembly 12 for operatively connecting the compressor to the main automobile engine 14. The compressor 10 is preferably of the type shown in United States Patent No. 3,057,545, issued October 9, 1962, and the clutch assembly 12 is preferably of the type shown in United States Patent No. 3,082,933, issued March 26, 1963. The subassembly further includes a conventional air fuel supply system 15 having an air cleaner 16 and carburetor 18 for directing fuel and air into an intake manifold 19 of the engine 14. In the riser 20 leading to the intake manifold 19 is located a pivoted butterfly valve member or throttle valve 22 having an overtravel lever 24 connected thereto for rotating the valving member 22 to control the air fuel ratio directed through riser 20 into the manifold 19.

The system further includes a magnetic valve device 26 secured on the underside of a flange 28 on one end of the compressor 10 that is located in close proximity to a coil 30 selectively energizable to drivingly connect a pulley 32 to a power takeoff 33 from the engine upon movement of an armature component 34 of the clutch in an axial direction along the shaft of the compressor.

The valve 26 more particularly includes an outer housing 36 of non-magnetic material forming an internal chamber 38 in which is disposed a movable magnetic valving element 40 having permanent poles formed thereon as illustrated. The body 36 forms an inlet opening 42 in communication with the internal chamber 38 for communicating it with atmosphere and, additionally, has an inlet fitting 44 directed through one wall thereof for forming a second inlet opening 46 to the internal chamber 38. The fitting 44 is connected to a tubular conduit 48 for communicating the opening 46 therein to the interior of the intake manifold 19.

The valve 26 further includes an outlet fitting 50 thereon having an opening 52 therethrough in communication with the chamber 38 for communicating it with a fluid servomotor 54 through a tubular conduit 56. The servomotor 54 includes an outer housing 58 having a movable diaphragm member 60 located interiorly thereof for dividing the housing into a first and a second chamber 62, 64 on either side of the diaphragm 60. Within the chamber 62 is located a spring 66 for biasing the diaphragm 60 in a direction to increase the volume of the chamber 62 and decrease the volume of chamber 64. The diaphragm 60, in turn, is connected to an actuating rod 68 that is directed exteriorly of the housing 58 and interiorly of the riser 20 where the opposite end thereof is slidably received within the lost motion lever 24. A pin 70 is secured on the outermost end of rod 68 to engage the lever 24 following predetermined lost motion movement of the rod 68 outwardly of the riser 20 intended to take up tolerances and the like.

During periods when the automobile air conditioning system is turned off, the coil 30 is de-energized and the valving element 40 is in the illustrated position where it closes the opening 46 and opens communication between atmosphere and the chamber 38 through opening 42. Hence, atmospheric pressure is directed through the outlet fitting 50 and conduit 56 and in conjunction with the spring 66 causes the rod 68 to move inwardly of the riser 20 in a lost motion relationship with respect to the lever 24 whereby a first idle setting of the throttle valve 22 is determined by conventional idle system components in the carburetor 15.

In accordance with certain of the principles of the present invention, the idle speed of the engine is increased during operation of the compressor 10 to improve the quantity of the space cooling capacity provided thereby. The increase in idle speed is accomplished by increasing the opening of the butterfly valve 22. More particularly, during periods when the compressor 10 is connected to the engine by energization of the pulley, the flux field from the coil 30 thereof is sufficient to lift the magnetic valve element 40 upwardly, thus closing the atmospheric bleed opening 42 and opening communication between the internal chamber 38 and the intake manifold 18. Thus, vacuum pressure is introduced into the chamber 62 of the servomotor 54 through the outlet fitting 50 and conduit 56 to thereby cause the diaphragm 60 to be forced against the pressure of spring 66 and thereby cause the actuator rod 68 to move outwardly of the riser 20 to a point where the pin 70 engages the overtravel lever 24 to move the valve 22 into a second idle position. Accordingly, a greater air-fuel ratio is fed to the intake manifold to increase the idle speed of the engine and thereby increase the speed of the compressor for maintaining an increased capacity therefrom for improving space cooling in the automobile passenger compartment.

While the embodiment of the present invention as herein disclosed constitutes a preferred form, it is to be understood that other forms might be adopted.

What is claimed is as follows:

1. In an automotive vehicle, an internal combustion engine, an air conditioning system including a refrigerant compressor, said compressor having a magnetic clutch including a coil which upon energization creates a magnetic field causing said clutch to drivingly couple said compressor to said engine, and an idle speed control for said engine comprising permanent magnet means energized by the magnetic field created by said coil and adapted upon energization to increase the engine idle speed.

2. The combination of claim 1 wherein said engine includes an intake system controlled by a throttle valve and wherein said permanent magnet means is adapted upon energization to open said throttle valve to increase the engine idle speed.

3. The combination of claim 1 wherein said idle speed control further comprises a flexible diaphragm connected to control said throttle valve, said diaphragm being adapted to open said throttle valve in response to a decrease in the pressure in said intake system downstream of said throttle, wherein said idle speed control also comprises an air inlet to said diaphragm preventing control of said throttle valve by intake pressure applied against said diaphragm, and wherein said permanent magnet means is energized to close said air bleed and prevent admission of air to said diaphragm thereby causing said diaphragm to open said throttle valve.

References Cited by the Examiner

UNITED STATES PATENTS

| | | | |
|---|---|---|---|
| 1,814,577 | 8/1931 | Windle | 251—30 X |
| 2,023,418 | 12/1935 | Gustafson | 251—30 X |
| 2,972,465 | 2/1961 | Ray | 251—30 |
| 3,024,963 | 3/1962 | Jacobs | 230—15 |

MARK M. NEWMAN, *Primary Examiner.*

SAMUEL LEVINE, *Examiner.*

W. L. FREEH, *Assistant Examiner.*